United States Patent [19]
Helinski et al.

[11] Patent Number: 4,714,936
[45] Date of Patent: Dec. 22, 1987

[54] INK JET PRINTER

[75] Inventors: Richard R. Helinski, Hudson; Carl D. Lutz, Derry; Thomas R. Peer, Londonderry; Philip A. Eno, East Hampstead, all of N.H.

[73] Assignee: Howtek, Inc., Hudson, N.H.

[21] Appl. No.: 749,861

[22] Filed: Jun. 24, 1985

[51] Int. Cl.[4] .......... G01D 15/16
[52] U.S. Cl. .......... 346/140 R
[58] Field of Search .......... 346/140, 75

[56] References Cited

U.S. PATENT DOCUMENTS

| | | | |
|---|---|---|---|
| 3,564,120 | 2/1971 | Taylor | 346/75 X |
| 3,823,409 | 7/1974 | Carrell | 346/140 |
| 3,925,790 | 12/1975 | Fischbeck | 346/140 |
| 3,925,791 | 12/1975 | Hunt | 346/140 |
| 4,287,523 | 9/1981 | Thomas | 346/140 |
| 4,308,543 | 12/1981 | Shultz | 346/75 |
| 4,591,281 | 5/1986 | Howard | 346/75 X |
| 4,593,292 | 6/1986 | Lewis | 346/140 X |

*Primary Examiner*—Joseph W. Hartary
*Attorney, Agent, or Firm*—Cesari and McKenna

[57] ABSTRACT

A rotary ink jet printer can print at high speed in black and white as well as in color using hot-melt inks. The printer includes a rotary print wheel which supports a plurality of ink jetters distributed around its periphery. The jetters are divided into color groups with the jetters in each group drawing ink from a separate chamber of an ink reservoir with the different chambers containing different-colored inks. Each jetter can be aimed separately from all of the other jetters in the print wheel in a direction parallel to the rotary axis of the wheel as well as in a direction perpendicular thereto and tangent to the print wheel, enabling the jetters in the different groups during each revolution of the print wheel to print in a plurality of colors on a plurality of different lines of a recording medium advancing as a cylinder past the periphery of the print head. A mechanism for automatically aiming the jetters on the print wheel is also disclosed.

21 Claims, 8 Drawing Figures

INK JET PRINTER

This invention relates to a head for an ink jet printer. It relates more particularly to a print head of the rotary type which can print in black and white or in color.

BACKGROUND OF THE INVENTION

With the ever-increasing amounts of information generated by computers and by other means, it becomes more of a problem to reduce that information to permanent visible form as printing. Also, to enable the reader to comprehend the printed data more readily, it has become desirable to print parts of the data in color as graphs and different color blocks of text. One preferred type of printing is ink jet printing.

Ink jet printing systems can be divided into continuous jet-type and drop-on-demand-type systems. In the former, a succession of ink drops is ejected from a small nozzle toward a recording medium such as a paper sheet. Selected ones of these drops are deflected electrostatically into a gutter; the remaining undeflected drops reach the paper and form the printed lines and characters thereon according to a standard dot matrix. In the drop-on-demand or impulse jet-type printer, the volume of a pressure chamber filled with ink is suddenly decreased by the impression of an electrical driving pulse whereby an ink droplet is jetted from a nozzle communicating with that chamber. Thus, a single drop of ink is transferred to the paper by a single driving pulse following which the system returns to its original state. During printing, a succession of such droplets is ejected in response to a succession of drive pulses to form a character or figure on the paper according to a predetermined dot matrix. While some aspects of the present invention have applicability to both types of jet printing, we will describe the present invention as it is applied to a drop-on-demand-type printer.

Also, in ink jet printing, three different types of inks are normally used, namely water-base inks, oil-base inks and hot-melt or wax-base inks. However, there are certain disadvantages to using the first two types of ink in ink jet printers. The main disadvantage is that water- and oil-base inks interact with the fibers of ordinary paper so that the quality and resolution of the printing are not as high as might be desired. For the same reason, the ink colors are muted so that the printing is not be as bright and vivid as desired. Some of these problems can be overcome by using specially treated or coated paper as the recording medium. However, that tends to be a rather expensive expedient and does not entirely solve these problems in any event.

It has been proposed to improve the quality of ink jet printing, including color printing, through the use of hot-melt or wax-base inks which do not interact with ordinary paper. Indeed, special hot-melt subtractive-color inks have actually been developed and tested in non-rotary ink jet printers, resulting in the production of high quality subtractive-color printing, examples of such inks being disclosed in application Serial No. 688,000, filed Dec. 31, 1984, owned by the assignee of the present application. However, these non-rotary printers employ printing heads which have to be translated back and forth across the recording medium in order to print the lines of text thereon so that considerable time and energy is wasted accelerating and decelerating the head.

In order to increase printing speed, it is also known to mount a multiplicity of ink jet printing nozzles around the periphery of a rotating print head or wheel and to wrap the paper sheet or other recording medium about the wheel opposite the nozzles. In this arrangement, different nozzles on the wheel are aimed at slightly different locations on the paper so that, when they are pulsed, in timed relation to the rotation of the wheel, a line or lines of character-forming dots can be printed on the paper during each revolution of the wheel. The wheel is rotated continuously and the paper is advanced continuously in a direction parallel to the head axis in timed relation to the rotation of the wheel so that the wheel prints successive lines of dot matrix characters on the paper. However, the prior rotary ink jet print heads of which we are aware can only print in one color and only using water- or oil-base inks; they are not suitable for printing in black and white as well as in color, much less using wax-base inks of the type disclosed in the aforementioned application.

It would be desirable therefore if there existed an ink jet print head of the rotary variety which could print on ordinary paper using hot-melt or wax-base printing inks. There is an additional need for a rotary ink jet print head which can print in black and white and in color, especially with such wax-base inks, in order to produce high quality color copy at the speed and efficiency demanded today by the printing and graphics industries.

SUMMARY OF THE INVENTION

Accordingly, the present invention aims to provide an improved rotary ink jet printer.

Another object of the invention is to provide a rotary print wheel for an ink jet printer which can print using hot-melt or wax-base inks.

A further object of the invention is to provide a print wheel of this general type which can print in both black and white and in color.

Still another object of the invention is to provide a rotary ink jet printer which is able to print accurately positioned, high quality characters and lines on ordinary paper.

Another object of the invention is to provide a printer of this type which can print continuously line by line on a recording medium.

Yet another object of the invention is to provide a rotary head for ink jet printing with hot-melt inks which is relatively easy and inexpensive to maintain.

A further object of the invention is to provide a rotary ink jet print head which utilizes special ink jet nozzles to propel hot-melt ink drops to a recording medium reliably and accurately.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, this printer incorporates an ink jet print head of the rotary variety. In such a rotary printer, the print head or wheel revolves at a fixed speed about its axis. Paper or another printing medium is drawn from a source in the printer and formed into a partial cylinder around the print wheel. Ink jetters disposed around the periphery of the print wheel are pulsed while the paper is advanced parallel to the rotary axis of the wheel, with the pulsing of the ink jetters and the paper advance being coordinated and controlled so that the wheel prints dot matrix characters and lines on the paper. After being printed on, the printed sheet is conducted to the exit end of the printer, while a fresh sheet is advanced into position opposite the print wheel.

The print wheel is specially designed to print in multiple colors using hot-melt or wax-base inks. For this, it includes a plurality of ink reservoirs each containing a different color ink, which reservoirs are continuously refilled as the wheel rotates while printing. Feed tubes in the wheel conduct the inks from the reservoirs to the ink jetters which are arranged in groups around the print wheel, with the number of groups corresponding to the number of different color inks contained in the wheel. Special heaters are incorporated into the wheel to heat the ink reservoirs to maintain the ink contained therein in liquid form and to heat the feed tubes and jetters so that the ink is delivered to those jetters with the requisite viscosity to be jetted drop by drop to the paper or other medium being printed on. These heaters are controlled independently in a manner to be described later to minimize the formation of air bubbles in the ink being conducted to the jetters so that uniform ink droplets are ejected from the print wheel to the paper.

Furthermore, as will be described in detail later, the ink jetters in the print wheel can even be aimed separately and aligned with one another to assure sufficiently accurate placement of ink droplets on the paper to produce high quality dot matrix lines and characters thereon in both black and white and in color.

Further as will be seen, the print wheel itself is composed of a relatively small number of different metal and plastic parts which can be formed and molded in quantity relatively inexpensively and can be assembled easily so that the overall cost of the print wheel is not appreciably more than the costs of conventional print heads of this general type which do not have the advantages described above.

BRIEF DESCRIPTION OF THE DRAWINGS

For a fuller understanding of the nature and objects of the invention, reference should be had to the following detailed description, taken in connection with the accompanying drawings, in which.

DETAILED DESCRIPTION OF THE PREFERRED EMBODIMENT

Figure 1:
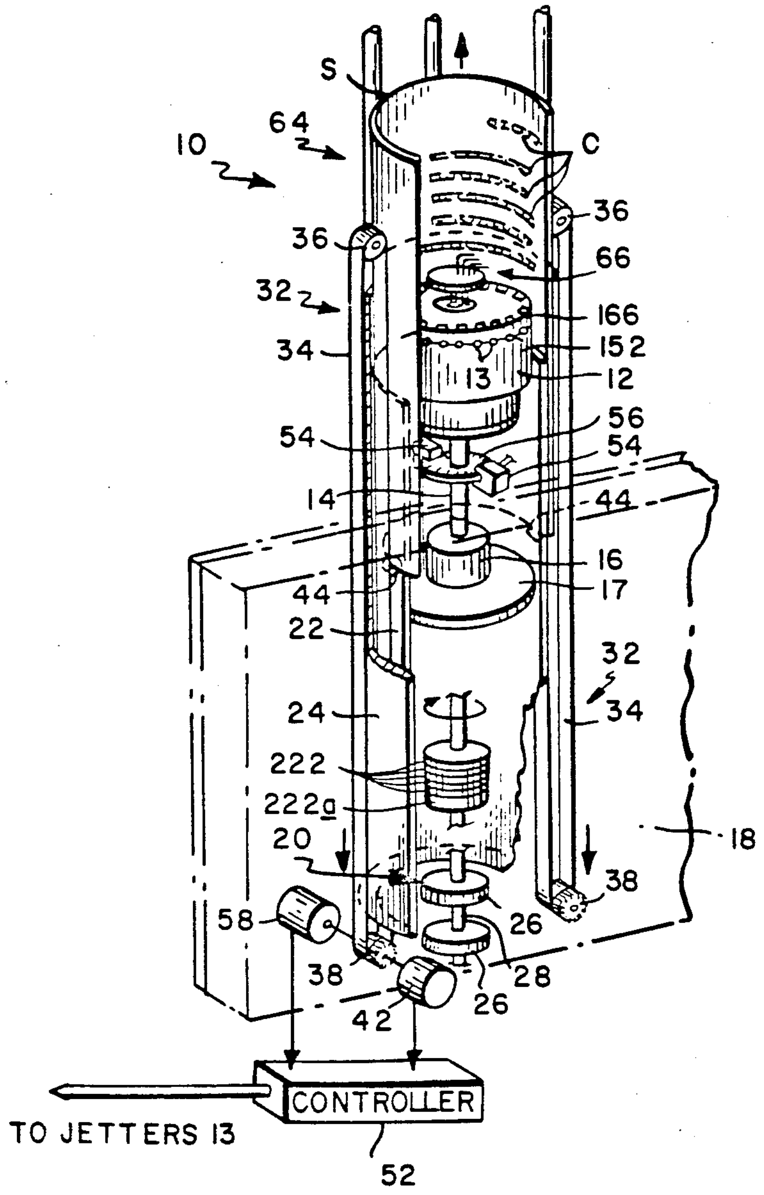
FIG. 1 is a fragmentary perspective view of an ink jet color printer made in accordance with this invention.

Referring to FIG. 1 of the drawings, an ink jet color printer indicated generally at 10 incorporates a rotary print wheel 12 having a peripheral array of ink jetters 13. The print wheel is mounted to the upper end of a rotary tubular shaft 14 which can be rotated continuously by an electric motor 16 supported on the printer base 17. Printer 10 includes provision for feeding paper sheets S from a paper cassette 18 removably mounted in the printer 10 below head 12.

A paper guide and feed assembly shown generally at 20 extracts paper sheets S from the cassette one after the other, forms each sheet into a partial cylinder that is coaxial with the wheel shaft 14 and advances the sheet upwards so that it is wrapped partially around the print wheel 12 and is spaced a short distance from the periphery of the wheel as shown in FIG. 1. A printer incorporating such a paper feed assembly is disclosed in detail in application Ser. No. 688,000, filed Dec. 31, 1984, now abandoned, entitled INK JET COLOR PRINTING, owned by the assignee of the present application. Since it is not part of the present invention, assembly 20 will not be described in detail here. Suffice it to say that it includes semi-cylindrical inner and outer paper guides 22 and 24 which are spaced apart and coaxial with the wheel shaft 14. The outer guide 24 extends up above head 12 whereas the inner guide 22 terminates below the head or at least below the jetters 13 therein. Paper feed rollers 26 mounted to a rotary shaft 28 draw the innermost paper sheet S from cassette 18 and slide it horizontally into the space between the two guides 22 and 24 at a location well below the print wheel 12.

Assembly 20 also includes a pair of identical vertical paper feeders 32 disposed on opposite sides of guides 22 and 24. Each such feeder is composed of a belt loop 34 stretched between upper and lower pulleys 36 and 38 such that the inner stretches of the belt loops extend up through the space between the guides 22 and 24 with their outer stretches lying outside guide 24. The lower pulleys 38 of the feeders 32 are geared together and driven by a step motor 42 so that the inner stretch of each belt loop moves upwardly between the guides. Furthermore, each loop carries a small tab 44 which projects laterally out from the loop.

Each time the horizontal feed rollers 26 insert a paper sheet S from cassette 18 between the paper guides 22 and 24, the vertical feeders 32 are activated so that the tabs 44 on the two belt loops engage under the lower edge of that inserted sheet and lift the sheet upwards so that its upper edge margin lies opposite the periphery of the print wheel 12. While the print wheel rotates continuously, the feeders 32 move the sheet S upwards past the print head on a continuous basis. At the same time, the ink jetters 13 are selectively actuated so that the printer 10 prints dot matrix characters C in black and white and/or in color at successive line positions on the sheet S opposite the print wheel.

In order to actuate the ink jetters 13 at just the right times to produce high quality characters C on sheet S, printer 10 includes a controller 52 which receives signals from a pair of optical detectors 54 positioned at diametrically opposite sides of a timing disk 56 located on shaft 14 just below wheel 12. The signals from the two detectors are summed to indicate the instantaneous angular position of the print wheel. Two detectors are used for this purpose to compensate for any eccentricity in the timing disk which might otherwise upset the timing of the system and thus the positions of the ink dots on the paper sheet. The controller also receives position signals from a shaft encoder 58 which senses the angular position of the lower pulleys 38 of the vertical paper feeders 32. Controller 52 processes this incoming timing data and develops separate trains of signals that are applied to the print wheel jetters 13 to cause the jetters to propel ink droplets to the upwardly moving sheet S to form the characters C on the sheet.

When that sheet is completed, it is guided by a suitable paper guide indicated generally at 64 to the exit end of printer 10. Simultaneously, a fresh paper sheet S is extracted from cassette 18 by rollers 26 and inserted into position between the paper guides 22 and 24 in preparation for the next printing cycle, all under the control of controller 52. While the printer 10 is printing, the print wheel 12 is constantly being replenished with ink from above by a stationary fill assembly mounted just above the wheel and shown generally at 66.

Figure 2:
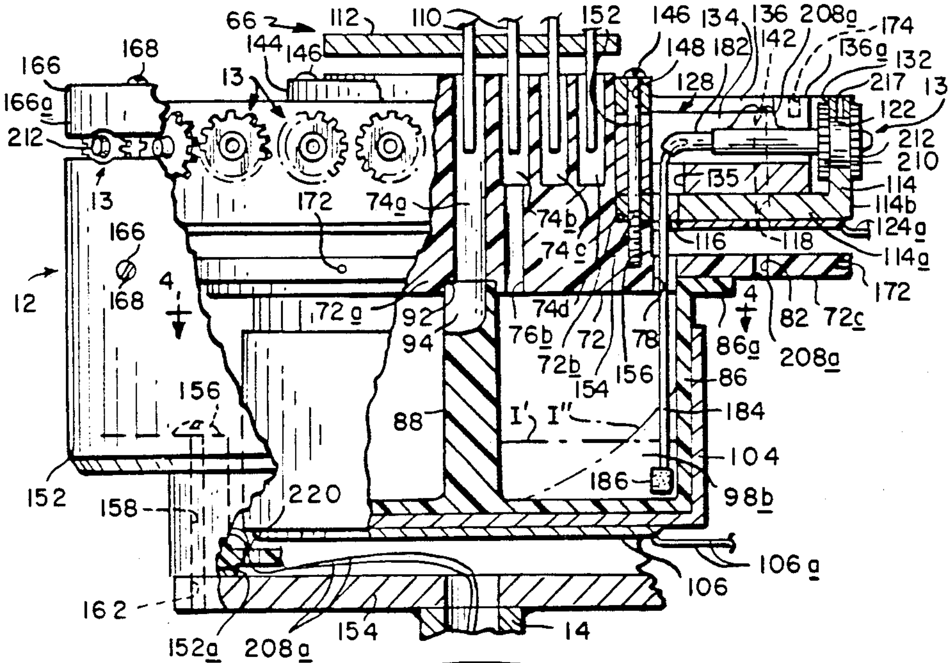
FIG. 2 is a side elevational view on a much larger scale with parts broken away showing the print wheel incorporated in the FIG. 1 printer in greater detail.
Figure 3:
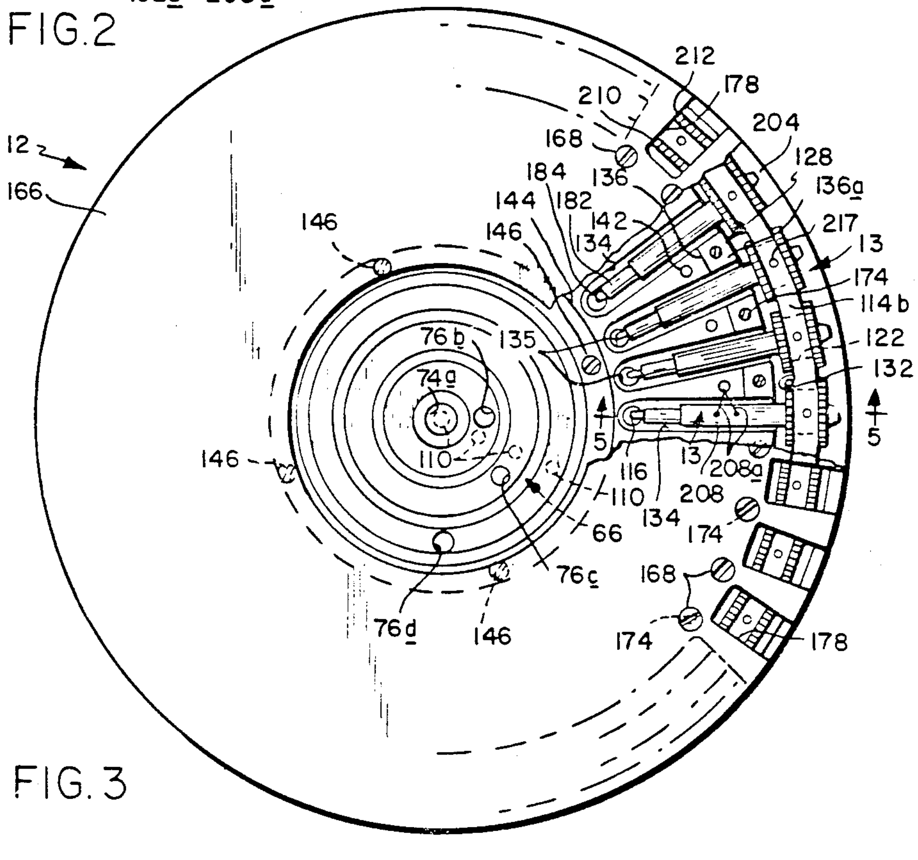
FIG. 3 is a top plan view with parts broken away of the print wheel.
Figure 4:
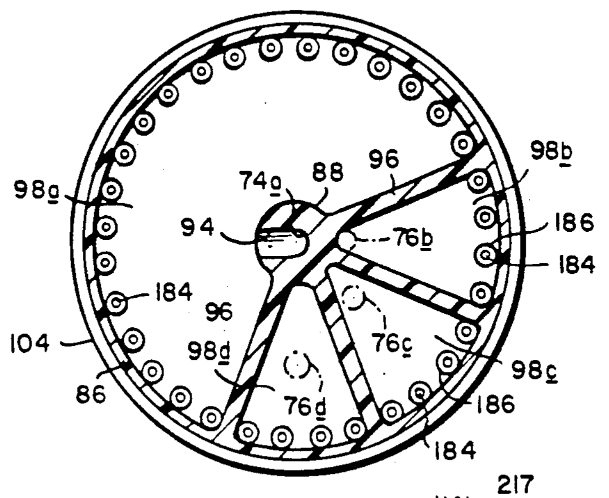
FIG. 4 is a sectional view along line 4—4 of FIG. 2.

Referring now to FIGS. 2 and 3 of the drawings, the print wheel 12 comprises a discoid support member 72 which is preferably molded of a suitable impact-resistant plastic material. Member 72 has a relatively thick central portion **72*a* whose outer edge margin is stepped to form an annular shelf 72*b* at the upper surface of the member. A second step at the outer edge margin of the support member defines a relatively wide peripheral flange 72*c*. Formed in the central portion 72*a* of member 72 are a series of relatively deep concentric circular vertical ink distribution channels or grooves. In the illustrated wheel, there are four such channels 74*a* to 74*d* distributed between the center of member portion 72*a* and its edge, with the innermost channel 74*a* actually being in the form of a cylindrical hole or passage which extends through member 72. The three channels 74*b* to 74*d* do not extend down through member 72. However, as shown in FIGS. 3 and 4, a vertical hole or passage is formed at the bottom of each of those channels which does penetrate through member 72. Thus, a passage 76*b* opens into groove 74*b*, a passage 76*c* is located at the bottom of channel 74*c* and a passage 76*d* extends down from the floor of channel 74*d*. These vertical passages and the central passage 74*a* are distributed about the axis of the print wheel so that together they define a spiral for reasons that will become apparent later. As best seen in FIG. 2, formed also in the support member 72 between its shelf 72*b* and its flange 72*c* is a circular array of vertical access holes 78 which extend down through that member. In the illustrated print wheel, there are 32 such holes 78. A second like-numbered array of vertical access holes 82 is provided through the member flange 72*c* outboard of holes 78**.

Referring now to FIGS. 2 and 4, mounted to the underside of support member 72 is a generally cylindrical cup-shaped ink reservoir 86 having a radial flange **86*a* at its upper edge. A central pedestal 88 projects up from the bottom of reservoir 86 and extends into a circular recess 92 formed at the underside of support member 72 at the location of its channel 74*a*. A vertical slot 94 is cut into the top of pedestal 88 that forms a right-angle extension of passage 74*a***.

As best seen in FIG. 4, the ink reservoir 86 is divided into four sectors by vertical dividing walls 96 which extend radially from pedestal 88 to the outer wall of the reservoir. In the illustrated print wheel which is capable of jetting the three primary substractive color inks cyan, magenta and yellow, as well as black ink, there are four such walls 96 which are positioned about pedestal 88 so as to divide the reservoir into one large sector **98*a* of about 225° for storing the black ink and three sectors 98*b* to 98*d*, each occupying about 45°, for storing the three primary color inks. The reservoir sector 98*a*** containing the black ink is made much larger than the others because the black ink is used not only to print black, but also for undercolor removal in color printing to conserve the colored inks.

The ink reservoir 86 is anchored to the underside of support member 72 at the top of pedestal 88, along the tops of the partition walls 96 and at the flange **86*a* by epoxy resin or another suitable bonding agent. When the reservoir is properly mounted to that member, it is seen from FIG. 4 that the vertical channel 74*a* through that member is connected via slot 94 to the interior of reservoir sector 98*a*, while the vertical hole 76*b* at the bottom of channel 74*b* leads to sector 98*b*. Similarly, due to the spiral arrangement of the holes at the bottoms of the distribution channels, hole 76*c* leads into reservoir sector 98*c*, while hole 76*d* communicates with sector 98*d*** of the reservoir.

Still referring to FIGS. 2 and 4, wheel 12 is specifically designed to print using hot-melt or wax-base inks. Therefore, the wheel includes provision for maintaining the inks in reservoir 86 at just the right temperature for printing. More particularly, a cylindrical cup-shaped heat sink 104 made of aluminum, copper or other thermally conductive material fits snugly about reservoir 86. Mounted to the underside of the heat sink is a wafer-like electric heater 106 which covers the bottom wall of the heat sink. When heater 106 is energized by electric current applied to its leads **106*a* from a suitable power source (not shown), the heat developed by the heater 106 is distributed by the heat sink 104 so that inks in the reservoir 86 are heated uniformly to the optimal temperature for printing. A conventional heat sensor (not shown) in circuit with heater 106 monitors the reservoir 86** temperature and controls the heater to maintain the proper temperature.

As shown in FIGS. 2 and 3, the sectors of reservoir 86 are continuously replenished with the four different inks as the print wheel 12 rotates by the fill assembly 66. This assembly comprises a set of fill tubes 110 supported by a stationary plate 112 mounted directly above the print wheel 12. In the illustrated head, there are four such fill tubes extending down into the four distribution channels **74*a* to 74*d*. The tubes are supplied with black and the three primary color inks from appropriate ink supplies (not shown), the black ink being routed to the central channel 74*a* which leads to the largest reservoir sector 98*a***.

Since the distribution channels **74*a* to 74*d* are all circular, the print wheel 12 is free to rotate despite the presence of tubes 110. The inks introduced into the channels through those tubes flow down through the passages 94 and 76*b* to 76*d* at the bottoms of those channels to the corresponding sectors of the reservoir 86**.

Referring again to FIG. 2, print wheel 12 also includes an annular heat sink 114 having a discoid bottom wall **114*a* and a generally cylindrical side wall 114*b* extending up vertically at the outer edge of the bottom wall. The heat sink 114 is made of a good thermal conductor such as aluminum or copper metal. The inner diameter of the heat sink is sized to snugly receive the thick central portion 72*a* of support member 72 so that the bottom wall 114*a*** of the heat sink rests on that member's shelf 72*b*. The outer diameter of the heat sink is more or less the same as that of support member 72.

Formed in the heat sink 114 just radially outboard of support member shoulder 72*b* is a circular array of vertical access holes 116 which extend down through the heat sink bottom wall 114*a* directly above holes 78 in support member 72. Thus, in the present print wheel, there are 32 such holes 116. The heat sink also has a second circular array of vertical access holes 118 spaced radially outward from holes 116. These holes 118 are located directly above access holes 82 in the support member 72. Still further, as shown in FIGS. 2 and 3, a set of horizontal holes 122 extend through the heat sink side wall 114*b* in which are mounted the ink jetters 13. The illustrated print head has 32 such holes 122 equally spaced around the print wheel for supporting 32 ink jetters whose construction will be described in detail later.

Mounted to the underside of the heat sink bottom wall 114*a* is a flat annular electric heater 124 which, like heater 106, is connected by way of its leads 124*a* to a current source. Heater 124 is controlled by a heat sensor (not shown) in thermal contact with the heat sink so as to maintain the ink jetters 13 mounted to the heat sink and the inks therein at the correct printing temperature.

Referring to FIGS. 2 and 3, positioned in heat sink 114 is a so-called heat sink adapter 128. This is a generally flat annular member made of the same material as the heat sink. Its inner diameter is sized to snugly receive the central portion 72*a* of the support member 72 and its outer edge or periphery is spaced slightly from the heat sink wall 114*b* thereby defining a circumferential gap 132 between those two members. Also, the heat sink adapter 128 has a circular array of radial slots 134. Each slot extends from the radially inboard edge of a heat sink hole 116 to the outer edge of the adapter and accommodates an ink jetter 13. Since there are 32 ink jets, there are 32 such slots 134 in the heat sink adapter 128.

At the bottom of each slot 134 opposite the holes 116 in the heat sink 114 is a vertical hole 135. Preferably, these holes 135 are radially elongated for reasons that will become apparent presently. As shown in FIG. 3, the slots 134 in the heat sink adapter are separated by radial wedge-shaped walls 136 which project above the ink jetters 13, with the radially outer edge margins 136*a* of those walls extending up to substantially the same height as the wall 114*b* of the heat sink. A circular array of vertical holes 142 is formed in the adapter walls 136 in register with the holes 118 in the heat sink. These holes, along with the registering holes 82 in the support member 72 constitute feedthroughs for the electrical leads from the ink jetters 13.

A flat ring 144 which fits snugly around the thick support member central portion 72*a* is seated on top of the heat sink adapter 128 and that ring, the adapter and heat sink 114 are clamped to the support member 72 by a series of long threaded fasteners 146 which extend down through registering holes 148, 152, 154 in the ring, heat sink adapter and heat sink respectively and are turned down into threaded holes 156 in the support member.

Referring now to FIG. 2, the components of the print wheel described thus far fit down inside a cup-shaped lower casing 152 made of a suitable impact-resistant plastic. This casing is mounted to the top of the rotary shaft 14. For this, the shaft carries a circular plate 154 which is secured to the cover bottom wall 152*a* by a series of threaded fasteners 157 which extend down through vertical passages 158 in the side wall of casing 152 into threaded holes 162 in plate 154. The components of the print wheel are retained in cover 152 by a set of threaded fasteners 166 which extend horizontally through holes 168 spaced around the side wall of casing 152 and are turned down into registering threaded holes 172 in the outer edge of support member flange 72*c*.

Referring to FIGS. 2 and 3, covering the top of the print wheel is an annular cover 166 made of the same material as the casing. The inner diameter of that cover is slightly larger than the outer diameter of the support member central portion 72*a* so that the cover fits snugly around that portion with the ink distribution channels 74*a* to 74*d* exposed at the top of the print wheel 12. The outer diameter of cover 173 is substantially the same as that of casing 152 and it has a depending peripheral flange 173*a* which partially covers, but does not obstruct, the ink jetters 13. That is, there is a sufficient gap between the casing and cover to permit the jetters to project droplets of ink to the paper sheet S being printed on. Cover 173 is retained in place by a circular array of threaded fasteners 175 which extend down through holes 177 in the cover into threaded holes 179 formed in the upstanding wall portions 136*a* of the heat sink adapter 128. Also, to provide overhead access to the 32 ink jetters 13, a circular array of 32 openings or notches 180 (FIG. 3) are formed in the outer edge margin of cover 173 directly above the jetters.

Referring now to FIGS. 2 to 4, the illustrated print wheel 12 carries 32 ink jetters 13 as noted previously. These are divided into three groups of four jetters each located in the sectors of the print wheel directly above the three smaller ink reservoir sectors 98*b* to 98*d* and one group of twenty ink jetters 13 located in the sector of the print wheel above reservoir sector 98*a*. Each ink jetter 13 is connected by a flexible coupling 182 to a feed tube 184 which extends down through holes 135 and 116 in the heat sink adapter and heat sink respectively and through a registering hole 78 in the support member 72 into the underlying sector of the ink reservoir 86. The lower end of each feed tube 184 is terminated by a sintered metal filter 186 spaced just above the bottom of the reservoir. As mentioned previously, the adapter holes 135 are radially elongated ro provide clearance in order to connect the tubes 184 to the couplings 182 and to assure registration with the heat sink holes 116.

As best seen in FIGS. 2 and 4, four tubes 184 extend down into each of the reservoir sectors 98*b* to 98*d* and twenty tubes 184 extend down into the large sector 98*a*. All of the tubes are located right adjacent to the radially outer wall of the reservoir 86 and they are substantially uniformly distributed around the circumference of the reservoir. Thus, when the various reservoir sectors are filled with inks I, the inks are free to flow through the filters 186 and along tubes 184 to the various ink jetters 13.

Figure 5:
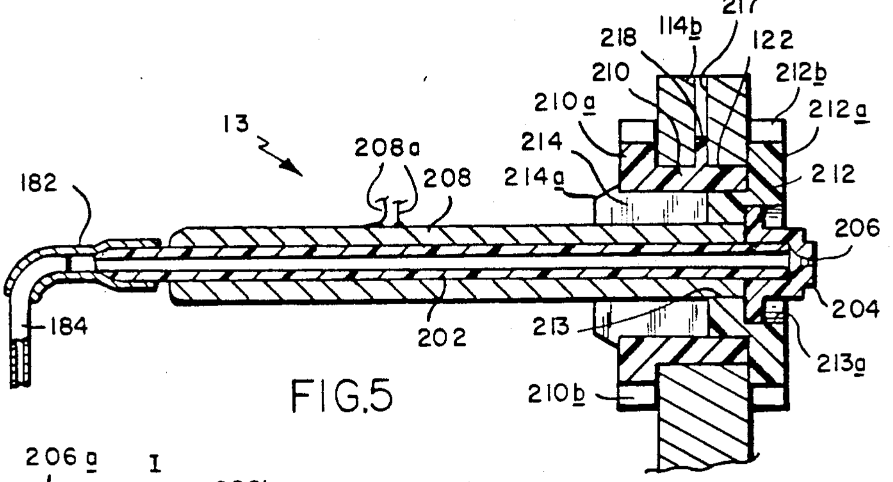
FIG. 5 is a sectional view on a still larger scale taken along line 5—5 of FIG. 3 showing one of the ink jetters incorporated into the FIG. 2 print wheel.
Figure 5A:
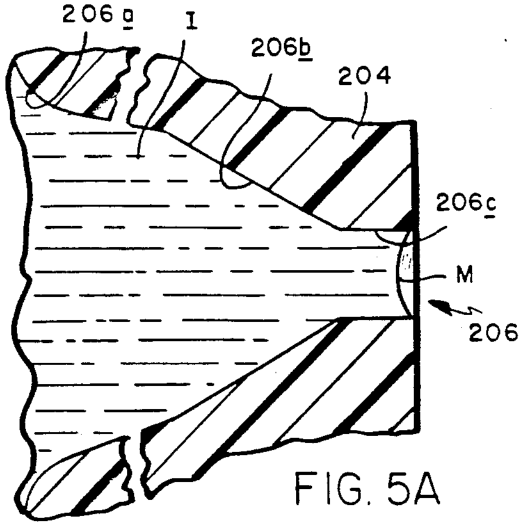
FIG. 5A is a fragmentary sectional view greatly enlarged showing in detail the nozzle of the FIG. 5 ink jetter.

Referring now to FIGS. 2 and 5, the ink jetters 13 are all of substantially identical construction. Each comprises a molded plastic tubular liner 202 having a molded plastic cup-shaped nozzle 204 engaged over the radially outer end of the liner. The nozzle 204 is anchored to the end of liner 202 by epoxy resin or another suitable bonding agent. A tiny orifice 206 is formed in the end of the nozzle which is collinear with the longitudinal axis of the liner. Orifice 206 is specially shaped and adapted to insure that uniformly sized ink droplets are ejected from the nozzle. More particularly, and as best seen in FIGS. 5 and 5A, the orifice 206 has a relatively large diameter, flared, radially inner section 206*a* which has a smoothly rounded inner edge. The radially inner diameter of that section is about 25 mils. From section 206*a*, the orifice converges along an intermediate frustoconical section 206*b* whose base diameter is about 16 mils to a very small diameter cylindrical outer section 206*c* whose diameter is in the order of 3 mils. As best seen in FIG. 5A, it is important for the proper operation of jetter 13 that the outside edge of orifice section 206*c* be square and uniform around its circumference so that uniformly sized ink droplets are ejected from the jetter nozzle 204.

Surrounding the liner 202 from nozzle 204 almost to the opposite end of the liner is a sleeve-like piezoelectric ceramic transducer 208. The transducer 208 is anchored to the liner by epoxy resin or other appropriate bonding means. The radially inner end of liner 202 not surrounded by the transducer is received in the flexible coupling 182 in order to connect the liner to its feed tube 184 as shown in FIG. 5. When an electrical pulse is applied to the transducer's electrical leads 208*a*, the transducer constricts radially along substantially its entire length, while undergoing minimum elongation so that it squeezes liner 202 radially inward along its entire length. This results in a single drop of ink being ejected from the nozzle 204 at the end of that liner.

Each ink jetter 13 is secured in the heat sink side wall 114*b* by way of a pair of radially inner and outer aiming cams 210 and 212 respectively. Cam 210 is basically an eccentric bushing which fits snugly in the heat sink side wall opening 122 so that the bushing flange 210*a* is positioned in gap 132 flush against the inside surface of wall 114*b*. The perimeter of flange 210*a* is toothed at 210*b* so that it constitues a spur gear to facilitate turning the cam for reasons that will become apparent. The cylindrical passage through cam 210 is eccentric to the cam outer surface so that, when the cam is rotated within its opening 122, its inner surface moves about an axis which is offset from the axis of rotation of the cam 210.

The outer cam 212 is also formed as an eccentric bushing in that its inner cylindrical passage 213 is eccentric to its outer surface. Cam 212 is rotatively received in cam 210 so that its flange 212*a* engages against the outside surface of the heat sink wall 114*b* as shown in FIG. 5. The perimeter of that flange is also formed with gear teeth 212*b* to facilitate turning that cam. Cam 212 is slotted lengthwise to form a circular array of springy fingers 214 and the ends of those fingers have barbs 214*a* so that, when the cam 212 is seated within cam 210, the barbs 214*a* resiliently engage over the flanged inner end of cam 210. Thus cam 212 is locked axially in cam 210 but it can still rotate relative to cam 210. When cam 210 is rotated within its opening 122, the cam 212 will be moved eccentrically within that opening. Cam 212, in turn, supports the jetter 13 in its passage 213 which is countersunk at its outer end 213*a* to accommodate nozzle 204. As just noted, that passage 213 is eccentric with respect to the outer surface of that cam which is received in cam 210. Therefore, when cam 212 is rotated with respect to cam 210, the jetter 13 will move eccentrically with respect to cam 210. Thus, by appropriately rotating the two cams 210 and 212, the jetter 13 can be moved within the heat sink opening 122 both vertically and horizontally within limits. This enables each jetter in the print head 12 to be aimed independently. In this way, the jetters can all be aligned relative to one another in a manner to be detailed later so that the ink droplets ejected from the jetters will be deposited at the correct locations on the paper sheet S to produce high quality lines and characters on that medium.

It is important to note that, except for the transducers 208, the components of the ink jetters 13 and the cams 210, 212 for aiming them are all molded plastic parts which can be made relatively inexpensively in quantity. Furthermore, those components are easy to assemble and install in the print wheel 12. To accomplish this, the two cams 210 and 212 are snapped into place within each opening 122 from opposite sides of the heat sink wall 114*b*. Then the jetter 13 is slid radially into the cam 212 until its nozzle 204 seats in the counterbore 213*a* formed in that cam and the opposite end of the jetter liner 202 engages in the corresponding coupling 182. In the event that it becomes necessary to replace one of the jetters 13, that is done equally easily by disconnecting the jetter from its coupling 182 and sliding it radially out of its cam 212. The frictional engagement between the cams 210 and 212 and between the cams 210 and wall 114*b* is strong enough at the operating temperature of the print wheel to prevent the cams, once set, from turning. In other words, when the heat sink 114 is heated, it expands enough at openings 122 to clamp against the cams 210 and 212 and hold them in their set positions. However, if necessary, small vertical holes 217 may be drilled into the heat sink wall 114*b* directly opposite the cams to accommodate friction plugs or pins 218 (FIG. 5) to further inhibit rotation of those cams.

As shown in FIG. 2, the electrical leads 208*a* from the jetter transducers 208 are conducted out of the print wheel 12 through the access holes 142, 118 and 82 in the heat sink adapter 128, heat sink 114 and support member 72 respectively. The leads are led down through the space between the heat sink cup 104 and the casing 152 and out of the casing through a circular array of holes 220 in casing bottom wall 152*a* and down through the tubular wheel shaft 14. Those leads 208*a* as well as the heater leads 106*a* and 124*a* and the leads from the heat sensors are connected to a stack of slip rings 222 mounted on shaft 14 below the timing disk 56 as shown in FIG. 1. The slip rings are contacted by wipers 222*a* connected to the controller 52. As noted above, the controller applies electrical pulses to the various jetters 13 in timed relation to the rotation of the print wheel 12 and the advancement of the paper sheet S by the vertical paper feeders 32 to print lines and characters C accurately on the sheet S opposite the print wheel.

Prior to printing with the print wheel 12, its heaters 106 and 124 are energized to heat the ink reservoir 86, the feed tubes 184 and the ink jetters 13 so that the inks flowing from and through those parts will be maintained at the proper temperature for jetting from nozzles 204. That is, the inks I are heated so that, when the wheel 12 is spinning at its normal speed for printing, say 150 rpm, the inks will flow from the reservoir 86 through the feed tubes 184 to the ink jetters 13 and stand as static liquid columns until the jetters are pulsed. More specifically, the ink viscosity and compliance are controlled in relation to the fluid resistances offered by the feed tubes 184 and jetters 13 so that the centrifugal force exerted on the inks due to the spinning print wheel will cause the inks to form continuous columns in their feed tubes 184 and jetters 13. Preferably, to prevent the inks from leaking from the wheel 12 and to insure that uniformly sized droplets are ejected from the jetters, a negative head of about 1.5 inch is maintained at each ink column so that a negative maniscus M is present at each nozzle orifice 206 as shown in FIG. 5A.

It should be mentioned in this connection that the static levels of the inks I in the reservoir 86 should be kept relatively low as indicated by the dashed line I' in FIG. 2. This is because when the wheel 12 spins, the resulting centrifugal force will force the inks radially outward so that they assume higher levels at the outer edge margin of the reservoir where tubes 184 are located as indicated by dotted line I'' in that same figure. This increased ink level affects the pressure head of the ink columns and therefore keeping the ink levels low in the reservoir minimizes this problem.

Also, to avoid any variations in the ink flow through the various feed tubes and jetters that could adversely affect the jetting process, it is highly desirable, if not essential, to minimize the presence of ink compliance-changing air bubbles in the ink columns leading to the jetters 13. This is accomplished in the present print wheel 12 by using very small diameter (e.g. 0.3 mil) ink flow paths from the reservoir 86 to the jetter nozzles 204 and by avoiding any dead spots in those paths. In other words, the ink feed tubes 184 from the reservoir to the jetter nozzles all extend either vertically or radially outward; they do not have bends or corners which lead back toward the spin axis of the print wheel that could be sites for air pockets.

In addition, since changes in ink temperature are a prime cause of air bubbles in the ink, a definite start up procedure is followed using the separate heaters 106 and 124 to condition the inks for printing. More particularly, the print wheel 12 is spun at a relatively high speed on the order of 600 rpm. At the same time, the ink paths from the reservoir 86 to nozzles 204 are heated beginning at the reservoir ends of those paths. In other words, first the heater 106 is turned on so that the ink reservoir and heat sink cup 104 are heated to a uniform temperature that liquifies the hot-melt inks in the reservoir and brings them to the desired viscosity. The various ink columns which stand as solid plugs in the feed tubes 184 melt gradually from the lower ends of those tubes upwards toward the jetters 13. Then heater 124 is turned on, thereby heating the heat sink 114 and the jetters supported thereby so that the inks plugging the upper ends of tubes 184, couplings 182 and the jetter liners 202 melt. This progressive melting of the ink columns while the wheel 12 is spinning forces any entrapped air bubbles, which are less dense than the inks, back down along tubes 184 into the reservoir where they can escape at the surfaces of the ink pools therein. Following this purge cycle, the speed of the wheel is reduced to its normal speed for printing, i.e. 150 rpm.

After printing, say at the end of the day, a similar wind-down procedure may be followed, to avoid the entrainment of air in the ink flow paths to the nozzles 204. Again, the wheel is spun at its higher speed while the heater 124 is turned off. The jetters 13 thus cool down first so that the inks therein solidify to form plugs which prevent air from entering the ink flow paths through nozzles 204. Then, heater 106 is turned off so that ink solidification proceeds down through tubes 184 into the reservoir, after which the wheel 12 is stopped.

As noted above, printer 10 has four jetters in each of the three primary color (cyan, magenta, yellow) jetter groups, with the different jetters in each group being aimed to direct ink droplets to different elevations on the paper sheet S. There is also a group of twenty jetters which print black dots. In other words, during operation of printer 10, the printer is able to print in color simultaneously four different rows of colored dots during each revolution of the print wheel.

Figure 6:
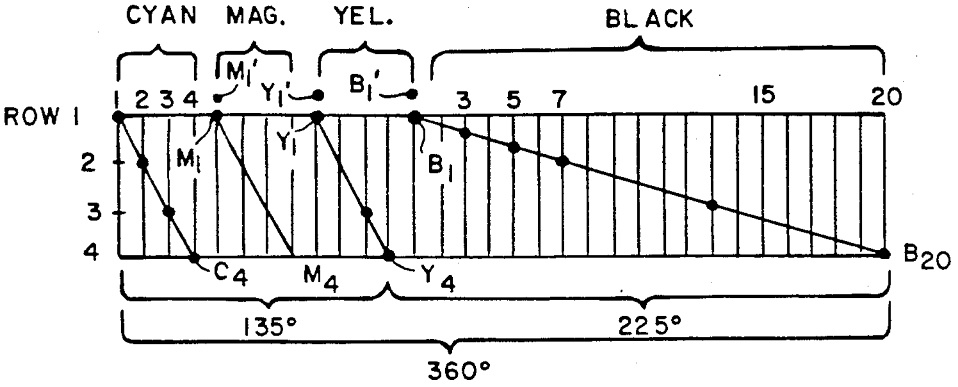
FIG. 6 is a planar diagram showing with dots the angular positions of the jetters on the rotary print wheel.

FIG. 6 is a planar diagram showing with dots the angular positions of the jetters on wheel 12 without taking into consideration the paper advance. In other words, assuming the print wheel and paper sheet S are stationary, the dots or spots in FIG. 6 represent the four rows of ink dots (Rows 1 to 4) that would be printed on the sheet if all of the jetters 13 were pulsed simultaneously. As seen from FIG. 6, the three groups of four color jetters occupy about 135° of the wheel 12 circumference, while the group of black jetters cover a 225° wheel sector. The angular spacing between all of the jetters is the same, i.e., 11.25°. In a practical printer, a standard $8\frac{1}{2}\times 11$ sheet of paper can fill about two-thirds of the circumference of the print wheel 12. This means that the 32 jetters 13 are packed in a print wheel which is about four inches in diameter.

For subtractive color printing, which is of prime interest here, the dots printed by the different groups of jetters must all be capable of printing in register in order for the printer to print the customary full range of colors from red to brown or black. Since the print wheel 10 is rotated at a constant speed, e.g. 150 rpm during printing, and the paper advance during color printing is substantially constant, e.g. 0.016 inch per revolution of the print wheel, this means that the ink jetters 13 in the different groups of jetters must be aimed vertically and horizontally very precisely to compensate for the paper advance occurring during the time it takes succeeding groups of jetters to rotate into the angular positions of the jetters in the first group.

Also, since there are twenty jetters 13 in the black group but only four in each of the three color groups, four of those black jetters must be aimed to print dots which register with the dots printed by the three groups of color jetters when printing in color at the slower paper feed rate. In print wheel 12, the first, third, fifth and seventh jetter in the black group constitute these so-called shared jetters 13 which print black dots in register with the color dots printed by the color jetters. It turns out that this is a unique arrangement given the indicated jetter number and spacing around the print wheel 12, wheel rotation rate, paper feed rate and ink drop velocity.

Still referring to FIG. 6, because the paper sheet F is advancing continuously as the print wheel 12 rotates, the jetters are not really aimed as indicated by the dots in FIG. 6. Rather, due to the paper advance, the dots in the succeeding groups of jetters must be aimed to lead the dots in the first group by increasing amounts. For example, if the first jetter M1 in the magenta group in FIG. 6 is to print in register with the first jetter C1 in the cyan group, it must be aimed at a point above dot M1 in FIG. 6, e.g., to location M1' slightly above Row 1. Similarly, if the first jetter Y1 in the yellow group is to print in register with the first jetter in the cyan group, it must be aimed at a location Y1' even further above Row 1. Likewise, the four shared jetters in the black group must be aimed selected distances above Row 1 in order for the ink dots printed by those jetters to register with the dots printed by the groups of color jetters.

If the print wheel 10 is printing in black, only the jetters 13 in the black group are pulsed. Since there are five times as many jetters in the black group as in each of the color groups, the printer 10 can print in black with a resolution which is five times that of its color printing capability. Alternatively, the paper sheet S can be advanced past the wheel 12 faster than its rate for color printing, e.g., 0.25 inch per second, so that the printer 10 has greater output.

Typically the print wheel 12 prints each character on sheet S in a space which is on the order of 100 mils high and 84 mils wide, there being, for example, thirty printed dots in the vertical direction and twenty printed dots in the horizontal direction.

Figure 7:
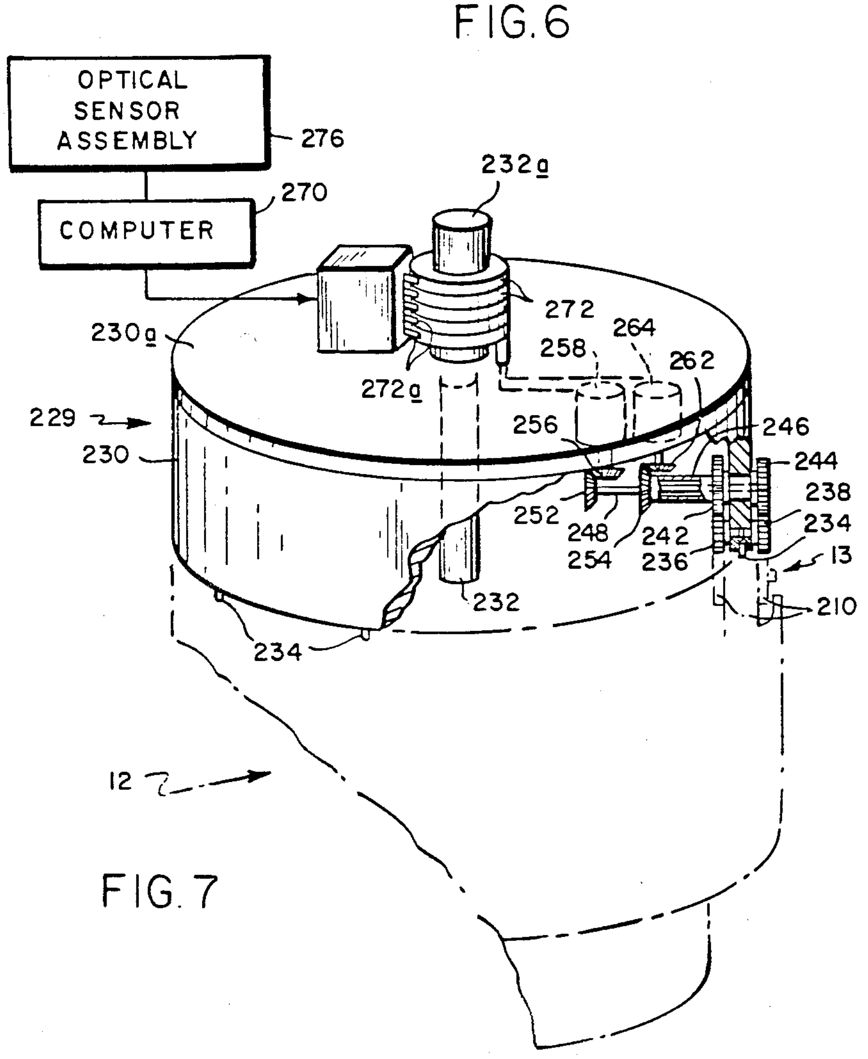
FIG. 7 is a diagrammatic view of a mechanism for aiming the jetters of the FIG. 2 print wheel.

As discussed previously, the jetters 13 are aimed vertically and horizontally by appropriately rotating their cams 210 and 212. FIG. 7 illustrates an aiming fixture 229 for accomplishing that. It comprises a relatively tall ring 230 having a top wall 230*a*. Ring 230 has essentially the same inner and outer diameters as the wall 114*b* of the heat sink in print wheel 12. Extending down from wall 230*a* at its center is a relatively long post 232 whose diameter is slightly less than that of the ink distribution passage 74*a* in the print wheel. When the ink filling assembly 66 illustrated in FIGS. 1 and 2 is removed from wheel 12, fixture 229 can be positioned on the print wheel with its post 232 engaged in passage 74*a* so that the lower edge of ring 230 is in register with the heat sink side wall 114*b*. To prevent relative rotation of the ring and print wheel, a plurality of vertical pins 234 projecting from the lower edge of the ring engage in the holes 217 present at the upper edge of the adapter wall 114*b*.

Still referring to FIG. 7, rotatively mounted in ring 230 adjacent its lower edge is one or more pairs of indepently rotatable spur gears. The spur gears 236 and 238 in each pair are positioned opposite one another adjacent to the inner and outer walls of the ring. Those gears project below the ring so that, when mechanism 229 is positioned on the print wheel 12 as described above, the gears 236 and 238 mesh with the gear-forming flanges of the cams 210 and 212 of a jetter 13 in the wheel. If there are more than one pair of gears 236 and 238, these are distributed about the axis of ring 230 such that each such pair of gears services a different jetter 13 in the print wheel. For example, there may be four gear pairs to service the corresponding jetters in each of the four groups of jetters, i.e., the ones that are aimed to produce superimposed or registering ink dots on the paper sheet S. However, for ease of illustration, only one such gear pair 236, 238 is shown in FIG. 7.

Mounted directly above each pair of gears 236 and 238 on ring 230 is a second pair of independently rotatable spur gears 242 and 244 which mesh with gears 236 and 238 respectively. Gear 42 has a tubular shaft 246 which projects toward the center of ring 230 which receives a similarly directed shaft 248 from gear 244. The two shafts 246 and 248 are terminated at their inner ends by bevel gears 252 and 254 respectively. Gear 252 meshes with a bevel gear 256 driven by a miniature bidirectional step motor 258 mounted on ring wall 230*a*. In a similar fashion, the bevel gear 254 meshes with a bevel gear 262 that is rotated by a second bidirectional step motor 264 on wall 230*a*. Thus, by stepping motor 258 in one direction or the other, the jetter cam 212 to which it is coupled can be rotated in one direction or the other. Likewise, when motor 264 is stepped in one direction or the other, the other cam 210 of that same jetter can be rotated in either direction. If ring 230 includes other gear pairs 236 and 238, similar step motors 258 and 264 are coupled to those gear pairs and may be actuated to aim other jetters 13 in the print wheel 12 in the same way.

The step motors 258 and 264 are controlled by signals from a computer 270. The jetters 13 in the print wheel 12 can be aimed while the wheel is mounted in a jig on a workbench. Alternatively, the jetters can be aimed dynamically while the print wheel is spinning in printer 10. In the latter event, the step motors would be connected to computer 270 by way of wipers 272*a* which contact slip rings 272 mounted to an upward extension 232*a* of ring post 232. Computer 270 processes data received from an optical sensor assembly 276 which is positioned to detect the locations of the dots printed on a paper sheet S positioned opposite the print wheel.

During the aiming procedure, one of the jetters 13 on the print wheel, say, the one represented by the first dot C1 in FIG. 6, is used as a reference and all of the other jetters are adjusted relative to that reference jetter C1. Thus, first that reference jetter C1 is pulsed making a dot C1 on the sheet S. Then the next jetter C2 is pulsed creating dot C2 on the sheet. Computer 270 has stored in its memory the correct coordinates for the dot C2 taking into consideration the angular velocity of the print wheel during printing, the speed of paper advance, the time it takes the ink droplet to travel from the jetter 13 to the sheet S, etc. The actual position on the sheet S of the dot produced by jetter C2 is then detected by the sensor assembly 276 and applied to computer 270 where the two positions are compared. If there is a discrepancy between the two, the computer 270 applies appropriate drive signals to the step motors 258 and 264 that will rotate the cams 212 and 210 of that jetter to re-aim the jetter so that the dot printed by that jetter is at the correct location on the paper sheet.

This same aiming procedure is followed with all of the other jetters 13 on the print wheel, the actual positions of the dots produced by those jetters being compared with their correct positions stored in the computer 270, all of those positions being referenced to the dot produced by the reference jetter C1. The jetters 13 can be aimed one by one or in groups depending upon the complexity of the aiming fixture 229. Also, as alluded to previously, the jetters can be aimed dynamically while the head 12 is rotating in printer 10 to achieve a very accurate positioning of the dots produced by the jetters. This is because the different colored printed dots produced by the jetters on sheet S can actually be observed. Thus, the jetters can be re-aimed directly by the operator who can enter aiming data manually into the computer 270 that will bring the dots produced by the corresponding jetters in the different jetter groups into exact register.

It will be seen from the foregoing then that the rotary printer described herein is able to print high quality characters and lines in color or in black and white. Furthermore, the print wheel incorporated into the printer is able to use hot-melt or wax-base inks so that the printer can print on ordinary untreated paper and other media such as plastic sheets or even metal foil that cannot ordinarily be printed on by printers using water- or oil-base inks. Since printer 10 utilizes a rotary-type print head or wheel, it is able to print high quality copy at a much faster rate than printers using reciprocating print heads. Therefore, printer 10 is better able to handle the voluminous data output from present day high-speed data processing systems.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A rotary ink jet printer comprising

A. a print wheel including a rotary support member for positioning within a printing medium wrapped as a collinear semicylinder about the print wheel;

B. means for rotating the support member about its rotary axis;

C. a plurality of ink jetters supported by the support member, each said jetter being arranged to project ink droplets radially from the support member in response to electrical signals;

D. an ink reservoir mounted to the support member below said jetters, said ink reservoir having a plurality of different ink chambers, one of said chambers being substantially larger than the other chambers;

E. means for conducting ink from each chamber to selected jetters of said plurality of jetters when said support member is rotated, the number of jetters to which ink is conducted from said one chamber being substantially greater than the number of jetters of which ink is conducted from each of the other chambers and the entrances of said conducting means from all of said chambers being located adjacent to the walls of said chambers furthest from said rotary axis;

F. means for aiming each jetter independently of the others in a first direction parallel to said rotary axis so that said print wheel can print a succession of dots in a plurality of different colors at a plurality of different line positions on the printing medium; and G. means for applying electrical signals selectively to said jetters.

2. The printer defined in claim 1 and further including means for aiming each of said jetters independently of the others in a second direction generally perpendicular to said first direction and tangent to said print wheel.

3. The printer defined in claim 1 wherein said plurality of jetters are divided into different groups and said conducting means conduct ink to the different groups of jetters from different chambers in the reservoir.

4. The printer defined in claim 3 wherein the print wheel has four reservoir chambers and four groups of jetters.

5. The printer defined in claim 3 wherein said reservoir is generally cylindrical with wedge-shaped chambers and is positioned coaxially on the support member.

6. The printer defined in claim 5 wherein each conduit is arranged so that no portion of that conduit is closer to said rotary axis than the conduit end positioned in said reservoir.

7. The printer defined in claim 1 and further including means for advancing the printing medium past the periphery of the print wheel in a direction parallel to said rotary axis.

8. The printer defined in claim 7 and further including means for coordinating and controlling said signal-applying means and said advancing means so that said print wheel prints successive lines of dot matrix characters on said printing medium.

9. The printer defined in claim 8 wherein said controlling means include means for producing timing signals representative of the angular position of said print wheel and means responsive to said timing signals for energizing selected jetters at selected angular positions of said print wheel.

10. The printer defined in claim 1 and further including means juxtaposed to the print wheel for supplying ink to each reservoir chamber while said print wheel rotates.

11. The printer defined in claim 10 wherein said ink-supplying means comprise means mounted to said support member defining a plurality of concentric vertical ink distribution channels; means defining a fluid pathway extending from each said channel to a unique one of said reservoir chambers and a fill tube extending generally parallel to said rotary axis into each of said channels so that, when said print wheel rotates, said channels provide clearance for said fill tubes.

12. A rotary ink jet printer comprising

A. a print wheel including a rotary support member for positioning within a printing medium wrapped as a collinear semicylinder about the print wheel;

B. means for rotating the support member about its rotary axis;

C. a plurality of ink jetters supported by the support member, each said jetter being arranged to project ink droplets radially from the support member in response to electrical signals;

D. an ink reservoir mounted to the support member below said jetters, said ink reservoir having a plurality of different ink chambers;

E. means for conducting ink from each chamber to selected jetters of said plurality of jetters when said support member is rotated;

F. means for aiming each jetter independently of the others in a first direction parallel to said rotary axis so that said print wheel can print a succession of dots in a plurality of different colors at a plurality of different line positions on the printing medium;

G. means for applying electrical signals selectively to said jetters; and

H. means juxtaposed to the print wheel for supplying ink to each reservoir chamber while said print wheel rotates, said ink supplying means including
   1. means mounted to said support member and defining a plurality of concentric vertical ink distribution channels,
   2. means defining a fluid pathway extending from each said channel to a unique one of said reservoir chambers, and
   3. a fill tube extending generally parallel to said rotary axis into each of said channels so that when said print wheel rotates, said channels provide clearance for said fill tubes.

13. The printer defined in claim 12 and further including means for controlledly heating said jetters, reservoir and conducting means so as to maintain the inks in said print wheel at a selected correct temperature for printing.

14. The printer defined in claim 13 wherein said heating means include a first heater for controlledly heating said reservoir and a second heater for controlledly heating said support member supporting said jetters.

15. A rotary ink jet printer comprising

A. a print wheel including a rotary support member for positioning within a printing medium wrapped as a collinear semicylinder about the print wheel;

B. means for rotating the support member about its rotary axis;

C. a plurality of ink jetters supported by the support member, each said jetter being arranged to project ink droplets radially from the support member in response to electrical signals and comprising 1. a small diameter tube having one end coupled to said ink-conducting means,
2. a nozzle mounted on the opposite end of said tube, said nozzle having an orifice with a radially outwardly flared inner segment closest to the tube, an intermediate frustoconical segment and an outer very small-diameter cylindrical segment, and
3. a piezoelectric ceramic sleeve engaged snugly around said tube between said nozzle and said conducting means;

D. an ink reservoir mounted to the support member below said jetters, said ink reservoir having a plurality of different ink chambers;

E. means for conducting ink from each chamber to selected jetters of said plurality of jetters when said support member is rotated;

F. means for aiming each jetter independently of the others in a first direction parallel to said rotary axis so that said print wheel can print a succession of dots in a plurality of different colors at a plurality of different line positions on the printing medium; and G. means for applying electrical signals selectively to said jetters.

16. The printer defined in claim 15 and further including means for attachment to said print wheel for automatically aiming the jetters as the print wheel is rotating.

17. The printer defined in claim 16 wherein said aiming means comprise an annular eccentric member snugly encircling said jetter and means for rotatively mounting said annular member to said support member so that when said annular member is rotated relative to said support member, said jetter is moved in a small circle whose axis coincides with the radius of said support member.

18. A rotary ink jet printer comprising

A. a print wheel including a rotary support member for positioning within a printing medium wrapped as a collinear semicylinder about the print wheel;

B. means for rotating the support member about its rotary axis;

C. a plurality of ink jetters supported by the support member, each said jetter being arranged to project ink droplets radially from the support member in response to electrical signals;

D. an ink reservoir mounted to the support member below said jetters, said ink reservoir having a plurality of different ink chambers;

E. means for conducting ink from each chamber to selected jetters of said plurality of jetters when said support member is rotated;

F. means for aiming each jetter independently of the others in a first direction parallel to said rotary axis so that said print wheel can print a succession of dots in a plurality of different colors at a plurality of different line positions on the printing medium;

G. means for applying electrical signals selectively to said jetters; and

H. means for attachment to said print wheel for automatically aiming the jetters as the print wheel is rotating, said aiming means comprising an annular eccentric member snugly encircling said jetter and means for rotatively mounting said annular member to said support member so that when said annular member is rotated relative to said support member, said jetter is moved in a small circle whose axis coincides with the radius of said support member.

19. The printer defined in claim 18 wherein each jetter comprises a small-diameter tube having one end coupled to said ink-conducting means; a nozzle mounted on the opposite end of said tube and a piezoelectric ceramic sleeve snugly engaged around said tube between said nozzle and said conducting means.

20. The printer defined in claim 19 wherein said nozzle orifice includes a radially outwardly flared inner segment closest to said tube; an intermediate frustoconical section and an outer very small-diameter cylindrical segment.

21. The printer defined in claim 18 and further including a second annular eccentric member encircling said jetter between said jetter and said first eccentric member, said second eccentric member being rotatable relative to said first eccentric member so that, by rotating said two eccentric members, the nozzle end of said jetter can be shifted axially and tangentially relative to the print wheel.

* * * * *